(12) United States Patent  (10) Patent No.: US 6,216,444 B1
Nagel  (45) Date of Patent: Apr. 17, 2001

(54) COMBUSTION ENGINE

(76) Inventor: Edmund Ferdinand Nagel, Reichsstrasse 82, A-6800 Feldkirch (AT)

( * ) Notice: Subject to any disclaimer, the term of this patent is extended or adjusted under 35 U.S.C. 154(b) by 0 days.

(21) Appl. No.: 09/310,855

(22) Filed: May 13, 1999

(30) Foreign Application Priority Data

May 14, 1998 (AT) ......................................... 833/98
Dec. 29, 1998 (EP) .................................. 98124890

(51) Int. Cl.$^7$ .................................................... F02C 3/00
(52) U.S. Cl. ............................. 60/39.63; 60/39.6; 60/595; 60/413; 60/614
(58) Field of Search ............................. 60/39.6, 39.63, 60/595, 413, 614

(56) References Cited

U.S. PATENT DOCUMENTS

| 2,872,778 | 2/1959 | Dane . |
| 3,918,263 | * 11/1975 | Swingle ................................. 60/614 |
| 4,212,162 | * 7/1980 | Kobayashi ........................... 60/39.63 |
| 4,212,163 | 7/1980 | Mikina . |
| 4,490,971 | * 1/1985 | Hedelin ............................... 60/39.63 |
| 4,716,720 | * 1/1988 | Eickmann ............................. 60/39.6 |
| 4,815,275 | * 3/1989 | Eickmann ............................. 60/39.6 |
| 5,109,666 | * 5/1992 | Eickmann ............................. 60/39.6 |

FOREIGN PATENT DOCUMENTS

| 172823 | 10/1952 | (AT) . |
| 202930 | 5/1939 | (CH) . |
| 46762 | 6/1966 | (DE) . |
| 1626398 | 7/1971 | (DE) . |
| 1 964 427 | 9/1971 | (DE) . |
| 3135619 | 9/1982 | (DE) . |
| 4136223 | 12/1992 | (DE) . |
| 32 14 516 | 10/1983 | (EP) . |
| 820750 | 11/1937 | (FR) . |
| 98/01338 | 1/1998 | (WO) . |

* cited by examiner

Primary Examiner—Thomas Denion
Assistant Examiner—Thai-Ba Trieu
(74) Attorney, Agent, or Firm—Wenderoth, Lind & Ponack, L.L.P.

(57) ABSTRACT

This invention pertains to a combustion engine having a combustion chamber (1, 201), which has an ignition device, for the combustion of a fuel with formation of a combustion gas during an explosion stroke, and also having a rigid wall that is displaceable by the expanding combustion gas. The movement of the rigid wall can be transmitted to a drive shaft (9, 267). The combustion chamber (1, 201) has a constant volume, and a pumping chamber (12, 212) separate from the combustion chamber (1, 201) and connected to the combustion chamber (1, 201) is provided for the conversion of the energy of the combustion gas into mechanical energy, which pumping chamber has the displaceable rigid wall. The pumping chamber (12, 212) is preferably formed by a cylinder in which a piston (11, 211) is displaceably housed, which piston forms the displaceable rigid wall.

21 Claims, 7 Drawing Sheets

COMBUSTION ENGINE

BACKGROUND OF THE INVENTION

The invention relates to a combustion engine with a combustion chamber which has an ignition device to burn a fuel accompanied by formation of a combustion gas during an explosion stroke. The combustion engine has a rigid wall which is displaceable by an expanding combustion gas and whose movement can be transmitted to a drive shaft.

Conventional combustion engines of this type are for example Otto engines and diesel engines or Stirling engines. With diesel engines and Otto engines, the combustion chamber is formed by a cylinder in which a piston is housed displaceably, which piston forms the rigid displaceable wall which is connected to a drive shaft.

Furthermore it is known from DE-OS 32 14 516 that the combustion gas generated in a combustion chamber, which is formed from a cylinder within which a piston is housed, is guided, after a first expansion and conversion into mechanical work, into a second cylinder with a piston housed therein for further expansion accompanied by further conversion into mechanical work.

SUMMARY OF THE INVENTION

The object of the invention is to increase the efficiency of a combustion engine of the type named previously, and this is achieved according to the invention in that the combustion chamber has a constant volume and a working chamber (also called pumping chamber) separate from the combustion chamber, but connected to the combustion chamber, is provided in order to convert the energy of the combustion gas into mechanical energy. The working chamber (or pumping chamber) has the displaceable rigid wall, and is preferably formed by a cylinder in which a piston is displaceably stored, which piston forms the displaceable rigid wall.

With conventional combustion engines of the type named previously, in which the displaceable wall is arranged directly in the combustion chamber, the combustion gas drawn off from the combustion chamber at the end of the explosion stroke is still under a relatively high above-atmospheric pressure. Because, within the combustion engine according to the invention, the combustion and conversion into mechanical work take place in different chambers, the energy inherent in the expanding work also takes place in different chambers. Thus, the energy inherent in the expanding combustion gas can largely be utilized. Advantageously, the pumping chamber (depending on, inter alia, the fuel used) can be designed so that at the end of the explosion stroke, when the end position of the displaceable wall is reached, the combustion gas is expanded to approximately atmospheric pressure.

Furthermore, the filling and the combustion process in the combustion chamber can be optimized so that no conversion of the energy of the combustion gas into mechanical driving energy of the engine takes place in the combustion chamber itself. Thus, the combustion chamber can, for example, in its shaping and in the arrangement of the ignition element, be optimally matched to the combustion process.

A pulsating recoil drive for water vehicles is known from WO 98/01338, in which the combustion gas formed in a combustion chamber is conducted into a pumping chamber filled with water, from which it expels the water by creation of a recoil. The pumping chamber of this combustion engine has no rigid displaceable wall, however, and instead forms a hydraulic element. Separate combustion and pumping chambers are used here because of the impossibility of filling the combustion chamber with water directly.

With the combustion engine according to the invention, an implosion stroke succeeding the explosion stroke is preferably provided in which the thermal energy of the expanded hot combustion gas is also to be at least partially utilized. To do this, a cooling medium is sprayed into the pumping chamber whereby the volume of the combustion gas reduces abruptly and a below-atmospheric pressure results which acts on the displaceable rigid wall of the pumping chamber.

With the combustion engine according to the invention, the feed lines or openings for fresh air and fuel, or for the mixture thereof, advantageously discharge exclusively into the combustion chamber, i.e. no such feed lines lead to the pumping chamber. The pumping chamber has advantageously only an exhaust gas outlet valve, and an overflow opening from the combustion chamber as gas inflow or gas outflow openings.

To achieve the highest possible efficiency and to minimize the resulting pollutants, the combustion chamber is advantageously filled with essentially constant charges of a combustible mixture (i.e. in contrast to conventional diesel or Otto engines, advantageously no charge-dependent filling of the combustion chamber is carried out). The ignition of the mixture takes place at a pressure of approx. 0.5 to 2 bar, preferably at approximately atmospheric pressure.

If the combustion engine according to the invention is for example to be used as a drive for a motor vehicle, it is proposed, in a first embodiment of the invention, in order to control the speed of the combustion engine, to connect to the drive shaft of the engine an infinitely variable, preferably hydrostatic transmission, whose function is explained in more detail in the description of the Figures. In a second embodiment of the invention, the power of the combustion engine is set such that, between work strokes in which ignitions of the mixture take place in the combustion chamber, idle strokes without such ignitions are interposed. In this case, a non-positive mechanical geared transmission can also be connected to the drive shaft, preferably via a clutch.

In a further embodiment, a hydraulic pumping device, which has at least one hydraulic-piston-cylinder unit, is driven directly by the piston of the pumping chamber without interpositioning of a crankshaft and rotating drive shaft. This hydraulic pumping device is designed to have an adjustable pumping volume and pressure, and it is therefore possible to use as a hydraulic engine driven by this hydraulic pumping device a non-adjustable hydraulic engine with a high degree of efficiency. As such a constant hydraulic engine, an inclined-disk piston engine which has an efficiency of $\eta>0.9$ in a large speed range, is particularly suitable. As hydraulic pumping devices based on piston cylinders also have a very high efficiency, overall an excellent total efficiency results.

BRIEF DESCRIPTION OF THE DRAWINGS

Several possible variants of this embodiment are explained in turn in the description of the Figures.

Further advantages and details of the invention are explained in the following with the help of the accompanying drawings.

DESCRIPTION OF THE PREFERRED EMBODIMENTS

Figure 1:
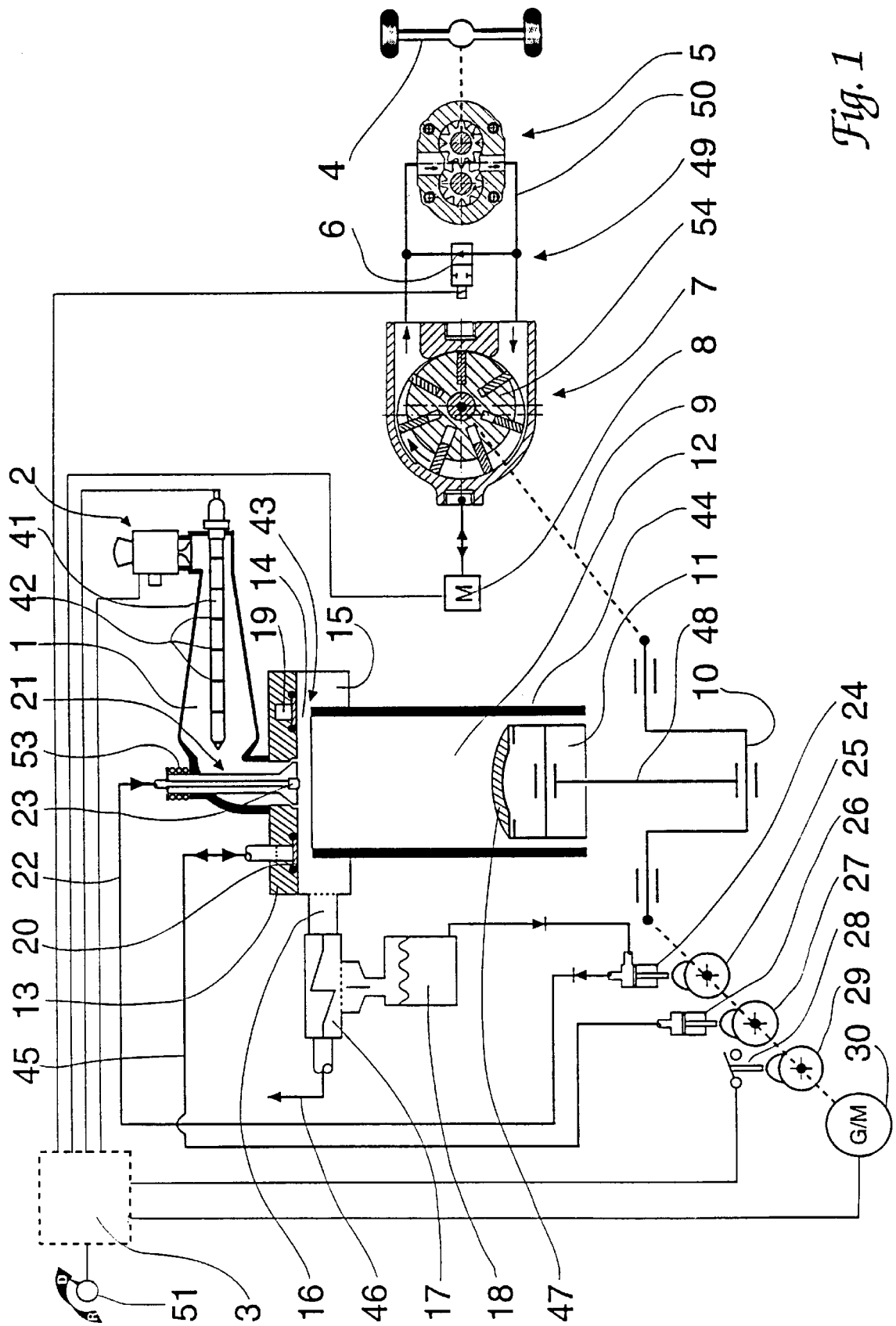
FIG. 1 is a schematic representation of a combustion engine according to the invention for driving a motor vehicle.

The combustion engine according to the invention represented in FIG. 1 has a combustion chamber 1 which can be filled via a mixture preparation device 2 with a fuel-air mixture, which fuel-air mixture is under atmospheric pressure in the combustion chamber 1. The fuel-air mixture is ignited via an ignition rod 41, which has several ignition points 42 along its length. One such ignition rod is described in WO 98/01338. Criteria for the suitable development of the combustion chamber are also contained in this document. The forming expanding combustion gas opens an inlet valve 21, which is a self-closing non-return valve, and then the combustion gas flows into a pumping chamber 12, which is a cylindrical space. A piston 11, which forms a displaceable rigid wall of the working chamber or pumping chamber 12, is pressed down by the expanding combustion gas. The volumes of combustion chamber 1 and pumping chamber 12 are dimensioned so that the combustion gas, when the piston 11 has reached its bottom dead centre, has expanded to atmospheric pressure and thereby has used up its pressure energy to the maximum.

An implosion stroke follows the explosion stroke just described. For this, a spray nozzle 23, which is arranged in a non-return valve tappet of the inlet valve 21, is supplied with a cooling liquid via a cooling liquid line 22, and the cooling liquid is then sprayed into the pumping chamber 12. The hot combustion gas therein is cooled abruptly and a below-atmospheric pressure develops in the pumping chamber 12. The below-atmospheric pressure has two effects: first, it is used to flush the combustion chamber 1 by sucking the combustion gas out of the combustion chamber 1 while sucking a new mixture into the combustion chamber 1 via the mixture-preparation device 2 against the resistance of throttles (as described further below); and second it is converted into mechanical work, and pulls the piston 11 upwards.

When the piston 11 has travelled approximately three-quarters of its path to the top dead centre, the flushing of the combustion chamber 1 is concluded, and approximately atmospheric pressure is reached in the combustion chamber 1 and in the pumping chamber 12 so that the inlet valve 21 closes by being pre-tensioned in the direction of closure via a spring 53. At approximately the same time, the outlet valve 43 opens. The outlet is formed by an annular gap 14 between cylinder head 13 and cylinder wall 44, which is bounded on the side of the cylinder head 13 by an elastic membrane 20. This elastic membrane 20 forms the outlet valve 43, and is arranged in the cylinder head 13 at the end of a blind groove 19 lying opposite the cylinder wall 44. The elastic membrane 20 seals the outlet by having a pressure medium forced thereagainst via a control line 45 and the blind groove 19.

When the pressure medium is forced into the blind groove 19, the membrane 20 is pressed against the cylinder wall 44 and closes the annular gap 14. If the pressure is reduced, the membrane 20 retracts to its initial position and opens the annular gap 14.

While the piston 11 moves further in the direction of the top dead centre, the combustion gas is forced out of the pumping chamber 12 through the collection chamber 15, the overflow line 16, the cooler 17 and the exhaust pipe 46. In the region of the top dead centre of the piston 11, a concavely-arched elastic cushion 47 arranged on the upper side of the piston 11 is pressed against the cylinder head 13, and thereby forces the remaining cooling liquid out of the pumping chamber 12. In the cooler 17, cooling liquid entrained with the combustion gas, is separated from the combustion gas and then collected in a cooling liquid store 18.

Due to the spraying-in of a cooling liquid during the implosion stroke, the piston 11 is not exposed to any particular thermal stress, and thus can be made of a light plastic. Furthermore, to make possible a lubrication-free running, the friction surfaces of the cylinder and of the piston can consist of materials with low friction coefficients, or can be coated with such materials, for example a ceramic coating. The movement of the piston 11 is transmitted via a piston rod 48 to a drive shaft 10 in the form of a crankshaft. Cams 25, 27, 29 and an alternator 30, which represents a combination of a generator and electric motor, are connected in a rotation-resistant manner to the crankshaft. The cam 25 activates a pump 24 for the cooling liquid when the piston 11 is located in the area of the bottom dead centre. The cam 27 impinges on the membrane 20 of the outlet valve 43 via the hydraulic pump 26 and closes the outlet valve 43, except during the expulsion phase of the combustion gas and the injection of the cooling liquid, which takes place from a location that is approximately four-fifths along the path of the piston 11 from the bottom dead centre to the top dead centre to a location at the top dead centre of the piston 11. The cam 29 actuates an interrupter 28, which pre-sets the ignition point of a control device 3 for the ignition rod 41 when the piston 11 is located in the region of the top dead centre.

The alternator 30 can on the one hand be operated as a generator to create electrical energy, on the other hand as an electric motor to start the combustion engine.

The camshaft is connected via a shaft connection 9 to a hydrostatic transmission 49 which drives a closed hydraulic circuit 50 including a hydrostatic adjustment pump 7 and a hydromotor 5 which drives a drive axle 4 of a motor vehicle. The hydrostatic transmission 49 is continuously adjustable in its transmission ratio by adjusting the eccentricity of a rotor 54 of the hydrostatic adjustment pump 7 via an adjustment motor 8 which is controllable by the control device 3, such that the delivery capacity of the adjustment pump 7 can be changed. The adjustment pump 7 can be short-circuited via a short-circuit valve 6.

If the mixture charging of the combustion chamber 1 remains constant, the power of the combustion engine is determined from the stroke count of the engine which can be influenced via the hydrostatic transmission 49. To increase the speed of the motor vehicle, the power output, i.e. the stroke count of the engine, must be increased. To achieve this, the charge applied to the engine is briefly reduced by reducing the transmission ratio of the transmission 49 by reducing the delivery capacity of the adjustment pump 7 via the adjustment motor 8. On reduction of the applied charge, the speed of the combustion engine increases. When the required speed is reached, the delivery capacity of the adjustment pump 7 is again increased to the extent that the speed of the engine now remains constant.

If on the other hand, the engine is overperforming, the ignition of the ignition rod 41 is switched off and the short-circuit valve 6 is opened. This effects a coasting of the hydromotor 5, and the adjustment pump 7 is stationary. As soon as engine power is needed again, the short-circuit valve 6 is closed and the hydromotor starts the pump in turn. Drive shaft 10 and piston 11 move and the ignition is switched on again.

To start the combustion engine when a vehicle is stationary, the drive shaft 10 is briefly driven by the alternator 30 operated as an electric motor. The adjustment pump 7 is set to "zero" charge (i.e. no delivery of hydraulic fluid) or the short-circuit valve 6 is opened.

To pre-set the vehicle speed or the power of the combustion engine, a setting device 51 connected to the control device 3 is provided. A reverse gear can be realized by setting the adjustment pump 7 so that the direction of delivery of the hydraulic fluid in the hydraulic circuit 50 reverses.

Figure 2:
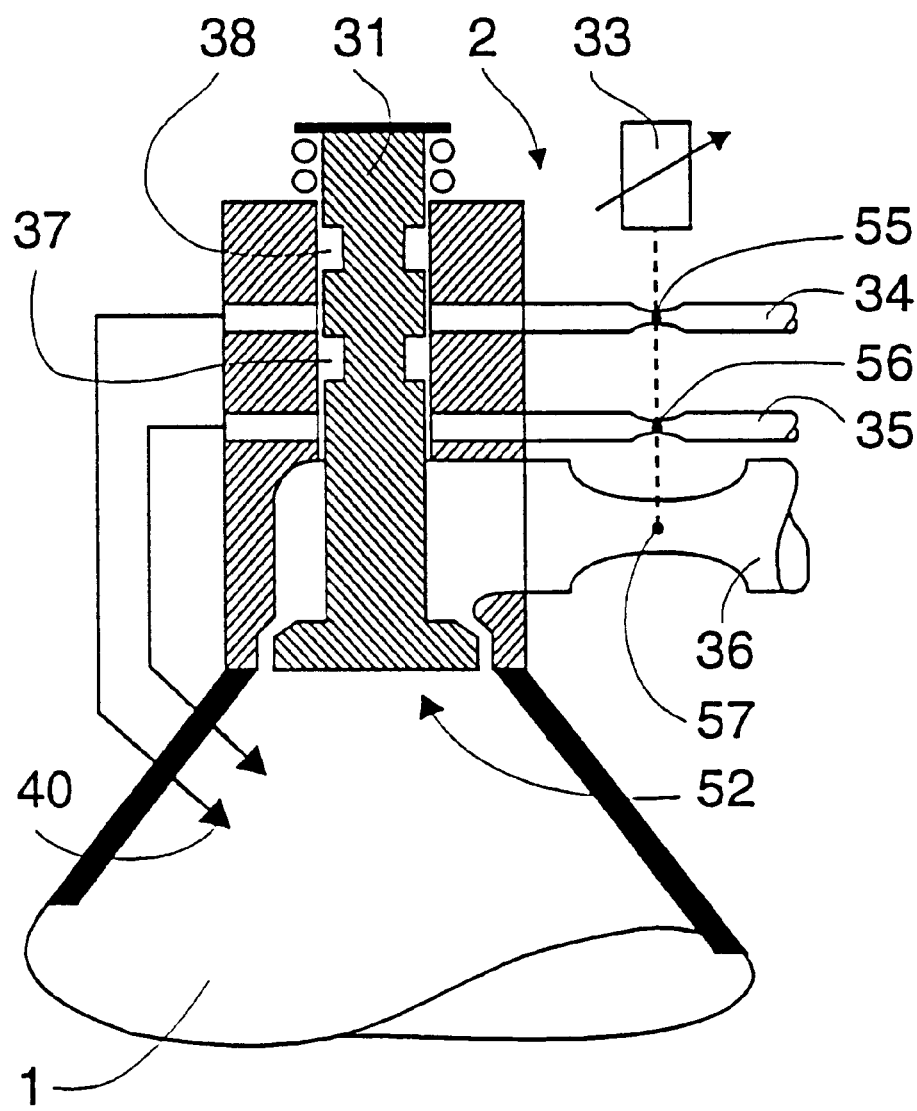
FIG. 2 is a schematic representation of the mixture-preparation device.

In FIG. 2, the mixture-preparation device 2 is represented schematically. Beside a line 36 for fresh air and a line 35 for the fuel, a line 34 provided with pressurized water is provided in order, via a spray nozzle 40, to also spray water into the combustion chamber 1, by which the nitrogen oxide proportion in the combustion gas is reduced. The lines 34, 35, 36 are throttled, and a regulator 33 controlled by the control device 3 is provided for inlet throttles 55, 56, 57. Depending on the speed of the combustion engine, different times are available to charge-the combustion chamber 1 during the implosion stroke (the pressure gradient in the combustion chamber always remains constant). A computer of the control device 3 uses these times to determine the required throttle openings which are set via the regulator 33.

The inlet valve 52 for the fresh air is formed by a non-return valve which is pre-tensioned in the direction of closure and opens if there is a below-atmospheric pressure in the combustion chamber 1, with inlet valves 37, 38 for the gaseous fuel and the pressurized water being formed simultaneously by the valve tappet 31 so that when the inlet valve 52 opens the inlet valves 37, 38 are also opened simultaneously.

Besides gaseous fuels, such as for example natural gas, liquid fuels may also be employed, in which case the mixture-preparation device 2, the ratios between the volumes of the combustion chamber 1 and of the pumping chamber 12, and the control by the control device 3 are to be matched accordingly.

Various mechanical or hydraulic transmissions are conceivable and possible as infinitely variable adjustable transmissions. Instead of a single combustion chamber and pumping chamber allocated to it, two or more combustion chambers and pumping chambers could be provided which act on the same shaft. In this way, for example, a two-cylinder machine could be realized, whose combustion chambers ignite at different times.

Figure 3:
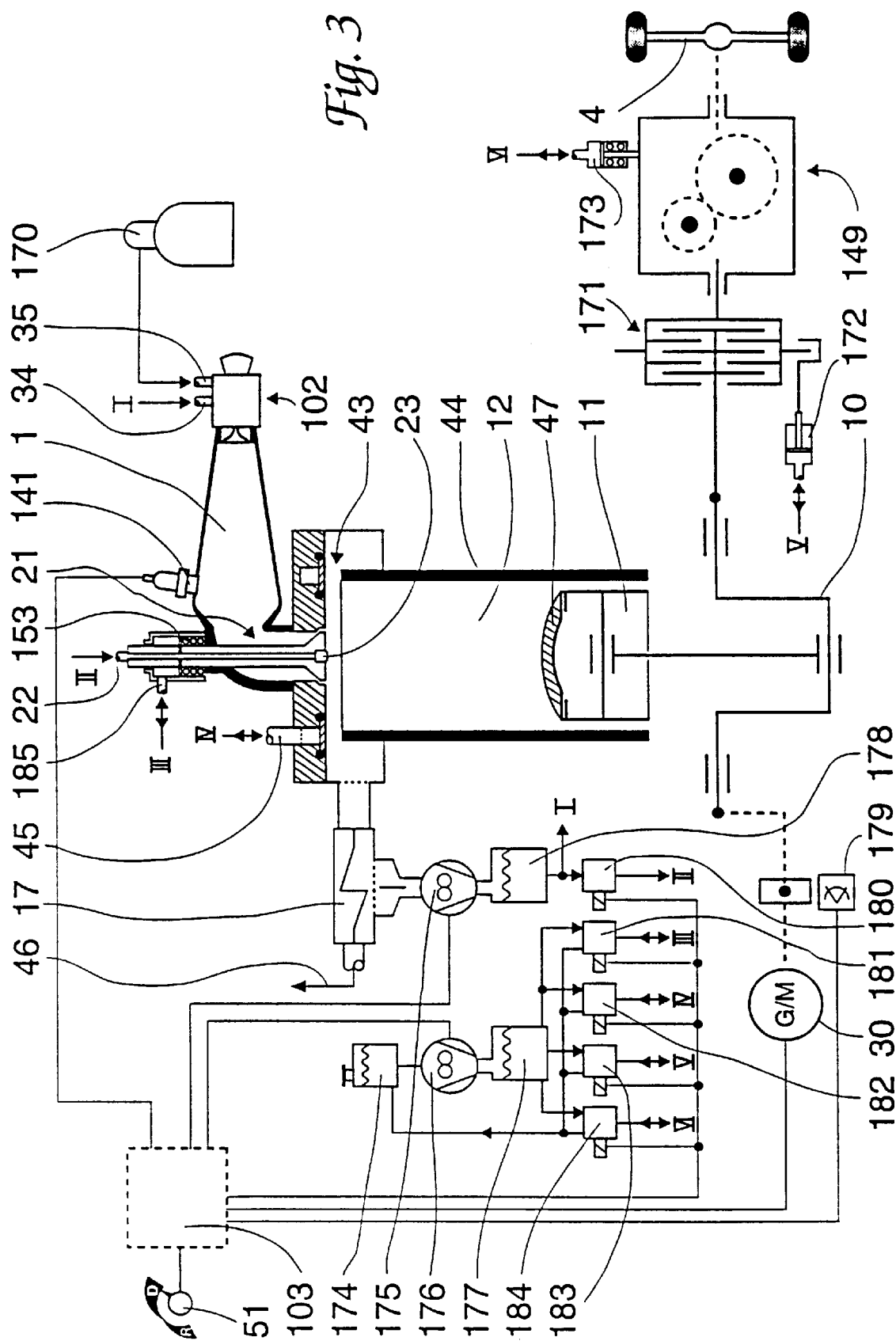
FIG. 3 is a second embodiment of a combustion engine according to the invention.

A second embodiment of the invention is represented in FIG. 3, those parts which remain the same being provided with the same reference numbers. The mode of operation is identical to that of the first embodiment in essential respects and the differences are described in the following.

The rotation angle of the drive shaft is recorded by a sensor 179 whose output signal is evaluated by a control device 103. The actuation device for spraying in cooling liquid, which is water in this case, comprises a water pressure pump 175 which pumps the water from a cooler 17 into a pressure store 178 as well as a valve 180, which is opened by the control device 103 when the piston 11 is roughly in the region of the bottom dead centre.

A further important difference of this embodiment is that the opening of the inlet valve 21 of the pumping chamber 12 can be triggered by the control device 103. For this, a valve 181 actuatable by the control device 103 is provided which, in the opened state, applies the pressure of the hydraulic fluid located in a pressure store 177 to the control line 185 and displaces the valve tappet of the inlet valve 21 against the force of the spring 153 into the opened position. The elastic force of the spring 153 is in this case so great that the valve 21, in normal operation, also remains closed even when there is a below-atmospheric pressure in the pumping chamber 12 or an above-atmospheric pressure in the combustion chamber 1, if the control line 185 is pressureless. The pressure in the pressure store 177 is created by a hydraulic pump 176 which pumps hydraulic fluid from the reservoir 174 into the pump store 177.

The use of the controllable inlet valve 21 allows, besides the control of the power of the combustion chamber 1 by virtue of idle strokes as is described below, a partial overlap of the implosion stroke and the explosion stroke. For this, the mixture in the combustion chamber 1 is already ignited while the piston 11 is still moving upwards, with the inlet valve 21 being closed, and being opened only in the region of the top dead centre of the piston 11 via valve 181 of the control device 103. Thereby, there is more time available for the relatively slow-spreading combustion of the mixture which is at atmospheric pressure in the combustion chamber 1 so that an ignition device with several ignition points can be dispensed with, and a conventional spark plug 141, for example, can be used as an ignition device.

Furthermore, because of the controllability of the inlet valve 21, the controllable throttles of the mixture-preparation device 102 can be dispensed with. This allows for, in this case, constant inlet openings for fresh air, for the preferably gaseous fuel supplied from a fuel tank 170, and for the water to be sprayed in for $NO_x$ reduction. After the start of the implosion stroke, the inlet valve 21 is only held open until the combustion chamber is completely filled with fresh mixture, and is then closed. With uniform charging of the combustion chamber 1, and the same pressure gradient in the combustion chamber 1, this period of time remains constant irrespective of the speed of the engine.

In contrast to the first embodiment of the invention, the drive shaft 10 is now connected via a clutch 171 to a mechanical non-positive multi-geared transmission 149. The clutch 171 can be opened via a pressure piston 172 that is operated by hydraulic fluid supplied under pressure from a pressure store 177 through a valve 183. The valve 183 is controlled by the control device 103. In the same way, a gear change of the multi-geared transmission 149 is effected by operating on one or more pistons 173, which occurs by opening one or more valves 184 which are likewise triggered by the control device 103.

The power of the combustion engine is now controlled or regulated by carrying out, besides work strokes in which an ignition of the mixture in the combustion chamber 1 takes place, idle strokes in which the mixture remains ignited in the combustion chamber 1. During these idle strokes, the inlet valve 21 remains closed and the outlet valve 43 remains open, so that the piston 11 pumps air essentially without power out of the combustion chamber 1 and into the exhaust pipe 46.

Depending on the power precisely required, the relationship between work strokes and idle strokes is established by the control device 103. The maximum power in each case at a particular stroke count of the engine is present when only work strokes and no idle strokes are carried out. At a particular charge applied to the drive axle 4 of the motor vehicle, the gear of the transmission 149 is selected so that the maximum power of the combustion engine at the speed of the drive shaft 10 resulting from this (or stroke count of the engine) is greater than the power required to apply the charge. The difference between the maximum power (only work strokes) and the momentarily required power resulting from the mixture of work strokes and idle strokes forms a temporary power reserve. If the vehicle is accelerated subsequently, fewer or even no idle strokes are carried out and the rotational speed of the drive axle 4 or the drive shaft 10 increases. When the maximum speed of the engine (for example 10,000 revolutions per minute) is reached, the clutch 171 is opened by the control device 103 via the valve 183 and the pressure piston 172, and a higher gear is engaged by the control device 103 via valve 184 and pressure piston 173, and the clutch 171 is then closed again. In a similar manner, the engaging of a lower gear is carried out when the power reserve of the engine is too small. When the vehicle is coasting, when there is no charge, the clutch 171 is opened and the engine is stationary, so that there is no power loss.

To start the engine when the vehicle is stationary, the alternator 30 operated as an electric engine is used, with the clutch 171 being opened at the beginning. The valve control of the inlet and outlet valves 21, 43 is carried out so that the downward movement of the piston 11 is used to fill the combustion chamber with a mixture of fuel and air.

Further parts of a sensory mechanism, such as sensors for measuring the travelling speed and for measuring pressure in the combustion chamber 1 (whereby it is ascertained whether there is still a mixture of fuel and air in the combustion chamber 1 when the engine is started, or if the combustion chamber 1 must first be filled) are not shown in FIG. 3 and their realization is a matter for the person skilled in the art.

To ensure a sufficient quietness of running of the engine despite the idle strokes, it is advantageous to provide at least two cylindrical pumping chambers 12 with associated combustion chambers 1, with the explosion and implosion strokes each being phase displaced by 180 degrees. Similarly, engines with three or more cylinders and associated pumping chambers would also be conceivable and possible, with each acting a in phase-displaced manner on the crankshaft.

Instead of the hydraulics for controlling the inlet valve 21, the outlet valve 43, the clutch 171 and the multi-geared transmission 149, a pneumatic mechanism could also be provided.

Figure 4:
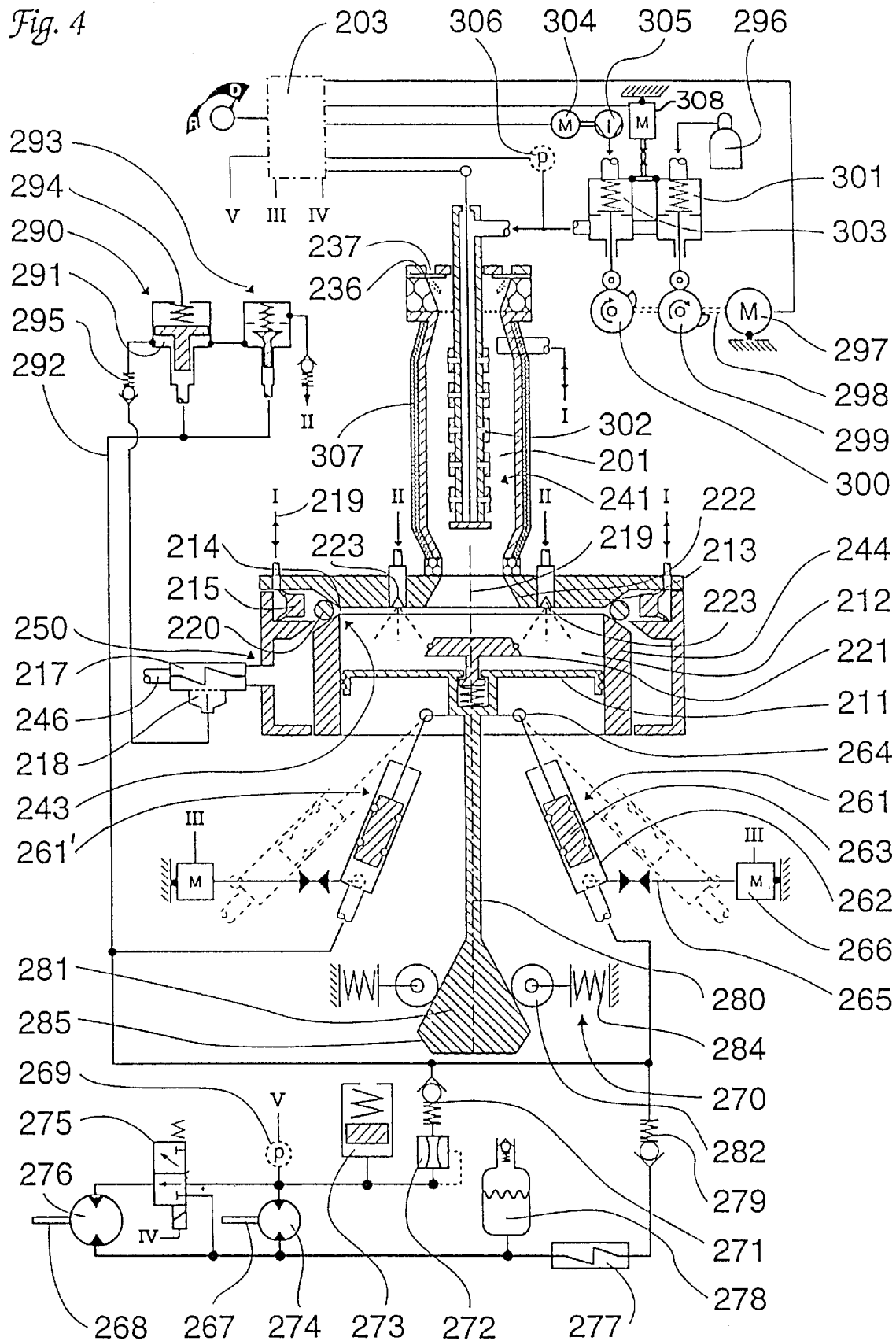
FIG. 4 is a third embodiment of a combustion engine according to the invention.

With the embodiment shown in FIG. 4, the inlet valve of a pumping chamber 212 is developed as a cylindrical space through which a combustion chamber 201 connects to the pumping chamber 212. The inlet valve is formed by a valve head 221 elastically housed in a piston 211 of the pumping chamber 212, and a valve seat 222 provided in an inlet opening 219 of the pumping chamber 212. At the beginning of the explosion stroke after the ignition of the combustible mixture in the combustion chamber, the developing pressure works first against the elastic pressure of the valve head 221 as well as against a spring store 270 described further below, so that a pressure can first build up in the combustion chamber 201 and the combustion can continue whereby no unburned mixture can enter the pumping chamber 212.

During the downward movement of the piston 211 during the explosion stroke, in this embodiment, the piston 211 directly drives an adjustable hydraulic pumping device which comprises hydraulic-piston-cylinder units 261, 261'. These each comprise pistons 263 housed in cylinders 262 and sealed off via sealing rings, which are secured via a knuckle 264 at the piston 211 of the pumping chamber 212. The two hydraulic-piston-cylinder units 261, 261' are symmetrically arranged on both sides of the piston 211 so that, upon a power transmission of the piston 211 to the pistons 263 of the hydraulic-piston-cylinder units 261, 261', there is no resulting overall force acting sideways on the piston 211. The mechanical friction losses of the piston 211 are thereby minimized.

The cylinders 262 of the hydraulic-piston-cylinder units 261, 261' are each articulated to adjustment rods 265 through which the hydraulic-piston-cylinder units 261, 261' can be symmetrically changed in their angular position vis-a-vis the piston 211 by virtue of respective servomotors 266. One such changed angular position is shown in FIG. 4 by broken lines. Depending on the respective angular position of the hydraulic-piston-cylinder units 261, 261', the stroke of the piston 263 changes upon movement of the piston 211 from the top dead centre to the bottom dead centre, and thus the volume of hydraulic fluid pumped by the hydraulic-piston-cylinder units 261, 261' as well as the delivery pressure also changes. Because the force impingement of the pistons 263 is axial, harmful friction losses are again minimized.

Instead of two hydraulic-piston-cylinder units arranged in mirror image, three or more hydraulic-piston-cylinder units arranged symmetrically to the piston 211 can be provided.

The hydraulic fluid delivered by the hydraulic-piston-cylinder units 261, 261' is fed through a non-return valve 271 and a throttle 272 to a hydraulic engine 274, with a spring store 273 being attached to the hydraulic line between throttle 272 and hydraulic engine 274, which line smoothes out the pressure impulses formed during the individual pumping strokes. The hydraulic engine 274 which drives a drive shaft 267 is nonadjustably developed (i.e. is a constant hydraulic engine), such that speed and torque cannot be preset at a given throughflow of hydraulic fluid and pressure of the hydraulic fluid. Particularly preferred is the use of an inclined-disk piston engine which has a very high level of efficiency via a high speed and torque range. The drain of the hydraulic engine 274 is connected to the cylinders 262 of the hydraulic-piston-cylinder units 261, 261' via a backflow line in which a cooler 277 and a further non-return valve 279 are arranged. Furthermore, a hydraulic store 278 in the form of a pressure store is attached to the backflow line between hydraulic engine 274 and non-return valve 279. This helps during the implosion stroke following the explosion stroke which is described in the following, to feed the hydraulic fluid into the cylinders 262 of the hydraulic-piston-cylinder units 261, 261'.

The throttle 272 is self-controlling and reduces its aperture when there is low counter-pressure in the hydraulic line, in order to specify a particular minimum-charge for the piston 211.

To operate all engine powers required in practice in one working range of the hydro engine which has the highest possible degree of efficiency, a second hydro engine 276 is provided which lies parallel to the hydro engine 274 and can be connected as required via the valve 275. Pressure sensor 269 is provided for control purposes. This second hydro engine 276 can act on the same drive shaft 267 as the first hydro engine 274 or on a second drive shaft 268.

The implosion stroke is again introduced at the end of the explosion stroke when the piston 211 is located in the region of its bottom dead centre, by activating a spray nozzle 223 and spraying a cooling liquid into the combustion chamber 201. The developing below-atmospheric pressure pulls the piston 211 upwards or inwards in the direction of its top dead centre, and is further used to flush the combustion chamber 201 by sucking combustion gas out of the combustion chamber 201, with fresh air subsequently flowing into the combustion chamber 201 through the inlet opening 237 that is closed by a self-locking non-return valve 236. In this embodiment, fuel is fed into the combustion chamber 201 only at the end of the explosion stroke, as is described further below.

The force acting on the piston 211 during the implosion stroke is not converted directly into drive power, but is at first stored temporarily in a spring store 270. The spring store 270 is formed by a conical extension 281 of the connecting rod arranged at the piston 211 which forms a bearing surface for rollers 282 connected to springs 284. On the inward movement of the piston 211, the springs 284 are tensioned. Shortly before reaching the top dead centre, the rollers reach a counter-inclination 285. Because of this, upon ignition of a new explosion stroke, it is initially necessary to overcome a certain counter-force which, as described above, serves to produce a time delay and to prevent the outflow of unburned working gas.

If, during the implosion stroke, the piston 211 is still located approximately one-third of its path away from the top dead centre, the valve head 221 closes the inlet opening 219 of the pumping chamber 212. At this point, the combustion gas in the combustion chamber 201 is completely replaced by fresh air. Further along the path of the piston 211 in the direction of its top dead centre, the combustion gas in the pumping chamber 212 is compressed above atmospheric pressure and expelled through an outlet valve 243, developed as a self-locking non-return valve, together with the cooling liquid from the pumping chamber 201. The outlet valve 243 is formed by an annular gap 214 between cylinder head 213 and cylinder wall 244, around which a pre-tensioned first elastic O-ring 220 is arranged. Outside the first O-ring 220, there is a second O-ring 215 which is subjected to pressure of the combustion gas in the combustion chamber 201 via a pressure line 219. During the explosion stroke, therefore, the first O-ring 220 closes the annular gap 214 by being forced by the second O-ring 215, due to the rear impingement surface of the first O-ring 220 being larger than the opening of the annular gap 214. During the implosion stroke with a low pressure in the combustion chamber 201 and an increasing pressure in the pumping chamber 212, the outlet valve 243 opens and the combustion gas as well as sprayed-in cooling liquid can flow out of the pumping chamber 212. The outlet valve is thus self-controlling and no relatively slow electronic valves are required.

The combustion gas subsequently escapes through the exhaust 246, and the cooling liquid is condensed in the cooler 217 and collects in the reservoir 218. During the explosion stroke, cooling liquid is conveyed from there through the piston pump 290 into a cylindrical space 291, representing a pressure store, of this piston pump. The piston pump 290 is actuated via hydraulic line 292 by the hydraulic pressure generated by the hydraulic-piston-cylinder units 261, 261'. Attached to the hydraulic line 292 is a self-opening valve 293 which is closed during the explosion stroke by the pressure in the hydraulic line 292. At the end of the explosion stroke, when the piston 211 of the pumping chamber 212 has reached its bottom dead centre and the pressure in the hydraulic line 292 drops, the valve 293 opens and the cooling liquid stored in the cylindrical space 291 is forced by a spring 294 of the piston pump 290 out of the cylindrical space 291 through the valve 293, with a backflow of the cooling liquid being hindered by non-return valve 295. The spray nozzles 223 attached to the valve 293 are supplied with cooling liquid, whereby an implosion stroke is introduced. The spraying device is thus self-controlling and requires no relatively slow electromagnetically actuatable valves.

At the point of the explosion stroke at which the inlet opening 219 of the valve head 221 is closed, the combustion chamber 201 can be prepared for a new explosion stroke. At this point, the combustion chamber 201 is filled with fresh air, with the pressure of the fresh air in the combustion chamber 201 depending on the closing force of the inlet valve 236 and being able to be 0.9 bar, for example. Fuel, which is stored in a tank 296, and can be for example gaseous, can now be added to the combustion air. An electric motor triggered by the control device 203 drives a camshaft 298 on which a fuel cam 299 and an air cam 300 are arranged. Firstly, the fuel cam 299 opens a fuel valve 301 whereby gaseous fuel can flow out of the tank 296 and into the combustion chamber 201. The fuel is fed into the combustion chamber 201 through a line in the ignition rod 241 which has several outlet openings 302. Thus, a uniform mixture can very rapidly be generated in the entire combustion chamber 201. As fuel remaining in the feed lines would lead to losses on the next implosion stroke, a brief flushing of the feed lines with air is carried out subsequent to the filling of the combustion chamber 201 with fuel, to which end the air cam 300, an air valve 303 actuated by the air cam 300, and a compressor formed from a motor 304 and a pump 305 is provided.

Subsequent to the filling of the combustion chamber 201 with fuel and the flushing of the feed lines with air, which is recorded by pressure sensor 306, an ignition signal is sent from the control device 203 to the ignition rod 241, whereby a new explosion stroke with a subsequent implosion stroke is established. The frequency with which such explosion and subsequent implosion strokes are carried out is thus determined by the speed of the motor 297, whereby the occurring power is established. How this power is converted into speed or torque of the hydromotor is determined by the setting of the hydraulic pumping device having the hydraulic-piston-cylinder units 261, 261'.

In order to achieve a uniform filling of the combustion chamber 201 with fuel or a uniform flushing of the fuel feed lines with air at all speeds of the electric motor 297, a servomotor 308 actuatable by the control device 203 is provided which throttles the inlet openings of the valves 301, 303 to different degrees depending on the speed of the electric motor 297.

In this embodiment, because the fuel is fed only towards the end of the implosion stroke, and therefore there is no danger of a premature self-diminution of the mixture, the combustion chamber 201 can be surrounded with an additional insulation 307 to minimize heat losses.

Figure 5:
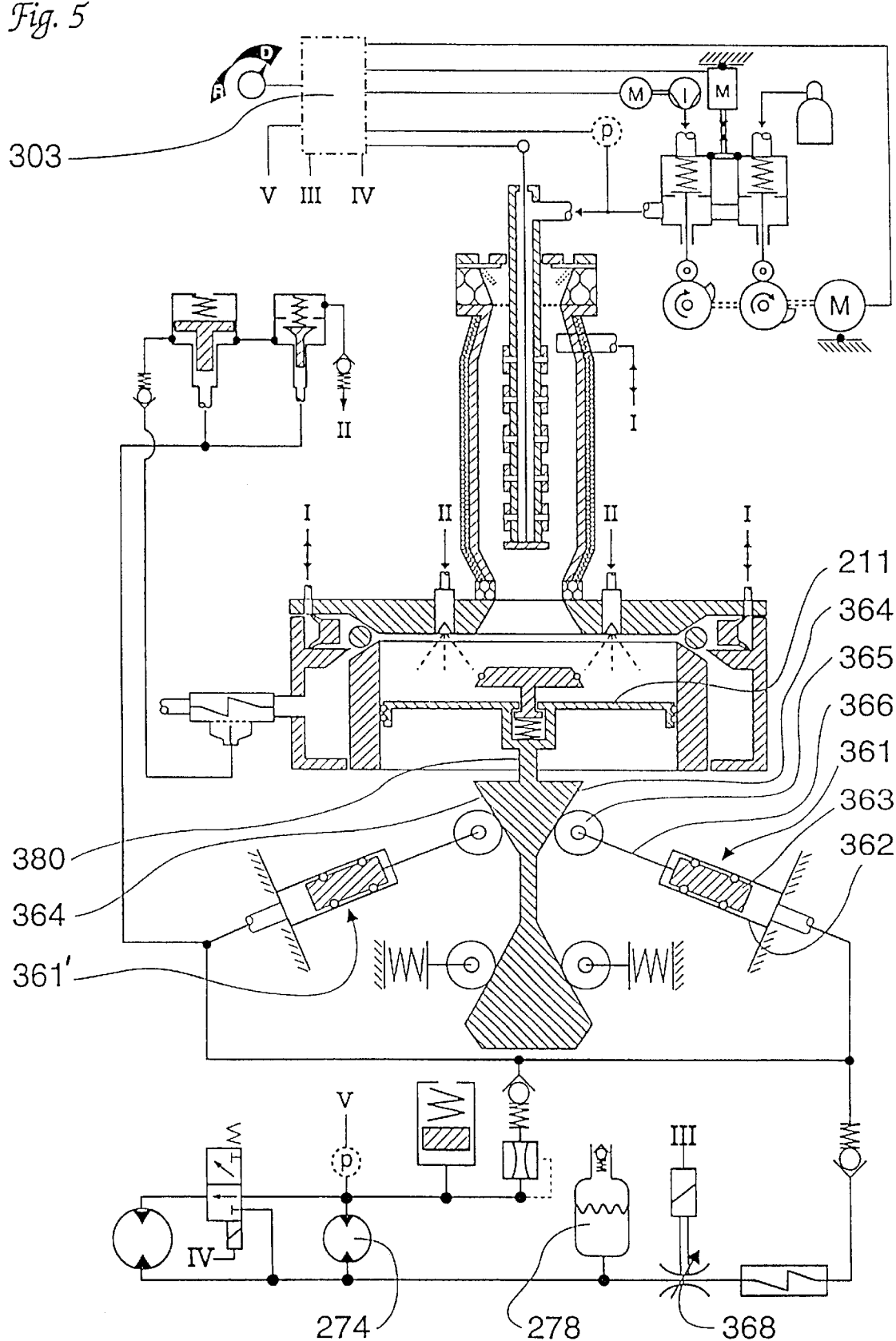
FIG. 5 is a fourth embodiment of a combustion engine according to the invention.

The embodiment shown in FIG. 5 differs from the embodiment according to FIG. 4 in the hydraulic pumping device driven by the piston 211. This again has two hydraulic-piston units 361, 361', arranged symmetrically to the piston 211, which in this case are arranged at a fixed angle to the axis of the piston 211. The pistons 363 of the hydraulic-piston-cylinder units 361, 361' have piston rods 366 at whose ends rollers 365 are arranged. These rollers 365 act together with conical actuation surfaces 364 provided at a connecting rod 380 of the piston 211 so that on an outward movement of the piston 211, the pistons 363 are pressed into the respective cylinders 362. A throttle 368 which can be set by a control device 303 is provided in the backflow line from the hydraulic engine 274 to the cylinders 362. On the inward movement of the piston 211 during the implosion stroke, hydraulic liquid flows at a defined speed out of the pressure store 278 and into the cylinders 362, whereby the pistons 363 accordingly move outward. At the end of the implosion stroke, the rollers 365 have more or less risen from the actuation surfaces 364 so that, on a subsequent explosion stroke, the energy of the combustion gas is initially only converted into kinetic energy of the piston 211, and a pumping power is brought about only from the time of contact of the actuation surfaces 364 with the rollers 365, whereby the volume of the pumped hydraulic liquid is correspondingly less and the pressure is correspondingly higher. As the force exerted on the hydraulic-piston-cylinder units again lies parallel to their axes, the friction losses are minimized. The remaining parts of the combustion engine according to the embodiment of FIG. 5 correspond to those of the previously-described embodiment, and need therefore not to be repeated.

Figure 6:
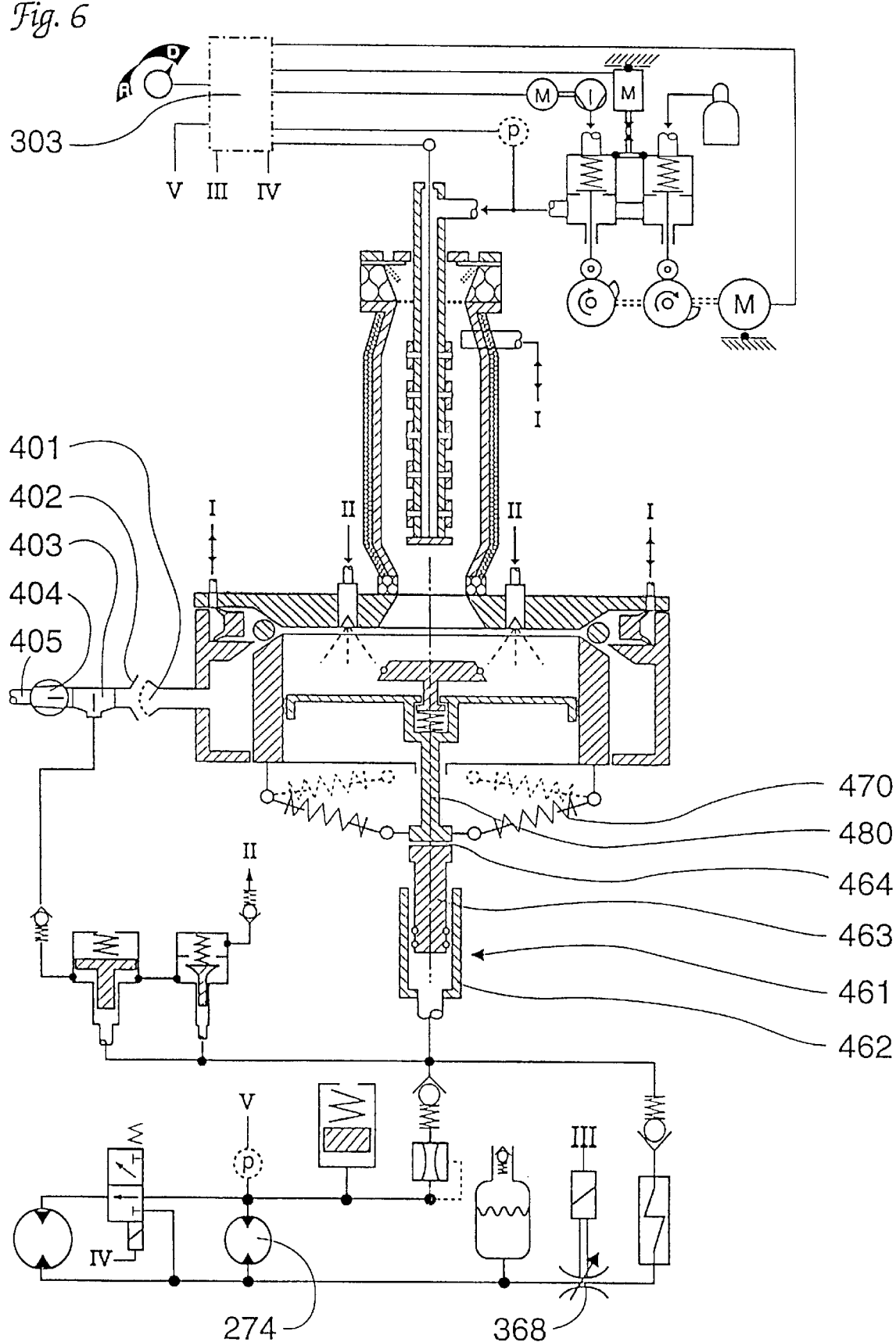
FIG. 6 is a fifth embodiment of a combustion engine according to the invention.

The embodiment shown in FIG. 6 differs from that shown in FIG. 5 in turn in the adjustable hydraulic pumping device. In this case, a single central hydraulic-piston-cylinder unit 461 is provided, which is actuated by a connecting rod 480 developed as a tappet, with an actuation surface 464 in this case being formed by the underside of the connecting rod 480. In turn, a throttle 368 that is adjustable by the control device 303 is provided in the backflow line for the hydraulic liquid from the hydraulic engine 274 to the hydraulic-piston-cylinder unit 461, which throttle 368 determines the backflow speed of the hydraulic liquid into cylinder 462 and thus determines the speed of the raising of the piston 463 during the implosion stroke. The pumping volume and the pumping pressure during the explosion stroke are determined according to the setting of this throttle 368.

A spring store for storing the energy released during the explosion stroke is, in this case, formed by pressure springs 470 whose function fully corresponds to the spring store described in connection with FIG. 4.

Furthermore, in this embodiment, the cooler shown in FIG. 4 and FIG. 5 is replaced as follows: The exhaust gas-water fixture from the engine is sprayed via a spray head 401 into an air-intake funnel 402. The exhaust gas-water mixture mixes with ambient air in the ratio of 1:50 to 1:100. Thereby, the exhaust gas-water mixture is abruptly cooled to approx. 30° C. The mixture, cooled to this extent, precipitates as water in collector 403. The suction of the fresh air is carried out by virtue of a downstream suction ventilator 404. The exhaust-gas cooling-air mixture is expelled via exhaust 405.

The remaining parts of the combustion engine according to this embodiment are again developed according to the embodiment according to FIG. 4.

Figure 7:
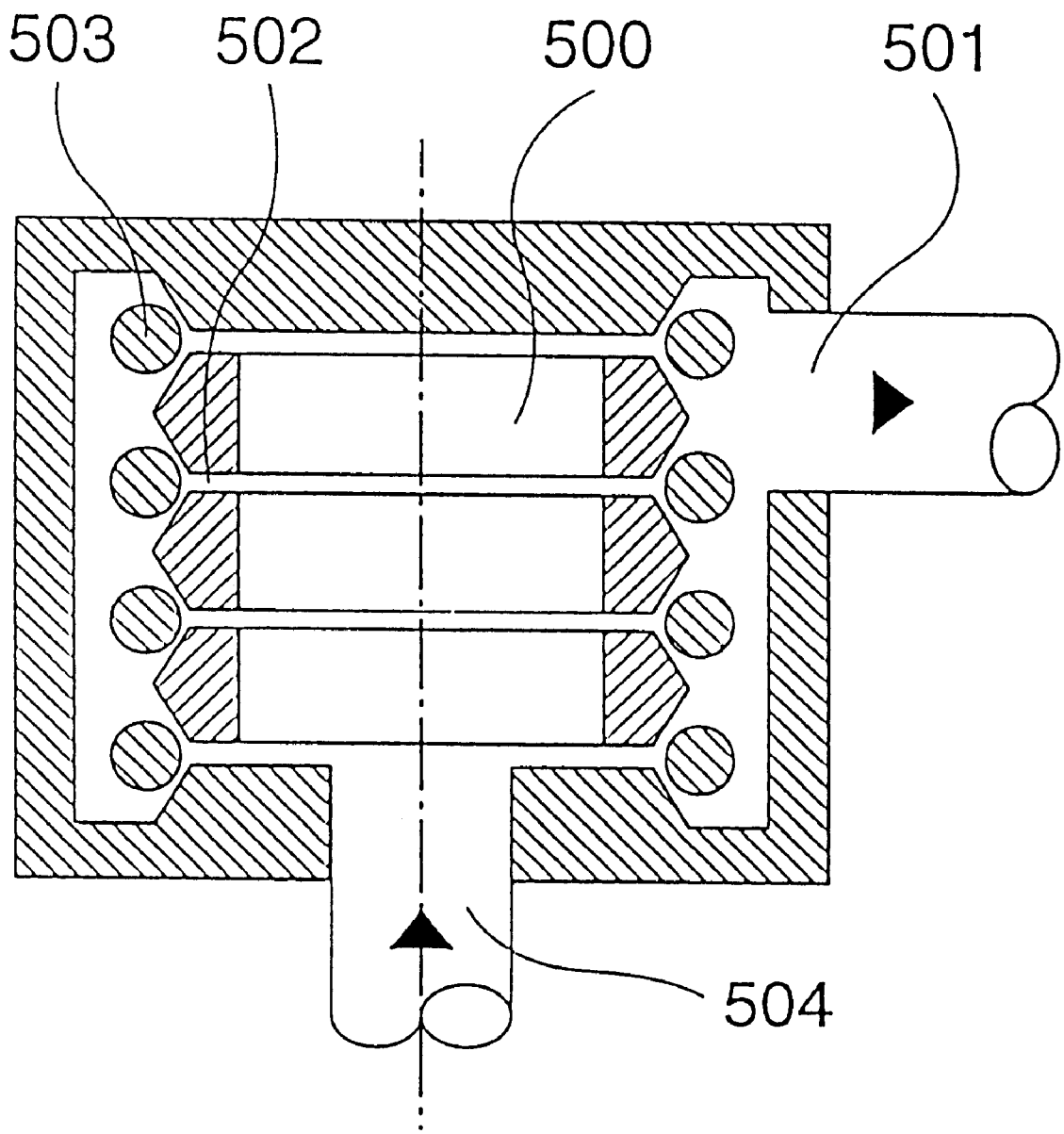
FIG. 7 is a schematic section through a self-locking non-return valve for use in the hydraulic circuit of a combustion engine according to the invention.

The non-return valves 271, 279 arranged in the hydraulic circuit (FIG. 4) must have extremely high switching frequencies with a high opening cross-section. A valve suitable for this is shown in FIG. 7. Between an inlet chamber 500 and an outlet chamber 501, a row of slit-shaped openings 502 are provided. Arranged above these are pretensioned O-rings 503 which are raised from the slits 502 by hydraulic liquid under pressure flowing through an inlet opening 504, and thereby open the slits 502. If the inlet chamber 500 is pressureless or if there is a flow in the opposite direction, the slits 502 are on the other hand closed by the O-rings 503.

The combustion engine according to the invention could also have pumping chambers other than cylindrical ones, which for example are developed in the manner of a Stirling engine, with a combustion chamber separate from the pumping chamber being provided in each case.

What is claimed is:

1. A combustion engine comprising:
   a combustion chamber having a constant volume and an ignition device to burn a fuel such that a combustion gas is generated during an explosion stroke of the combustion engine;
   a working chamber separate from and in fluid communication with said combustion chamber, and having a rigid wall that is displaceable by the combustion gas flowing from said combustion chamber into said working chamber during the explosion stroke of the combustion engine such that energy of the combustion gas is converted into mechanical energy; and
   an adjustable hydraulic pumping device including at least one hydraulic-piston-cylinder unit to drive at least one constant hydraulic engine, wherein said adjustable hydraulic pumping device is to be driven by displacement of said rigid wall due to the combustion gas flowing from said combustion chamber into said working chamber during the explosion stroke of the combustion engine.

2. The combustion engine according to claim 1, wherein said working chamber is defined by a cylinder in which a piston is displaceably housed, with said piston defining said rigid wall.

3. The combustion engine according to claim 2, wherein said adjustable hydraulic pumping device further includes a first non-return valve to connect said adjustable hydraulic pumping device to an inlet of the at least one constant hydraulic engine, and a second non-return valve to be arranged between said adjustable hydraulic pumping device and a hydraulic store in an outlet of the at least one constant hydraulic engine such that said adjustable hydraulic pumping device and the outlet of the at least one constant hydraulic engine are interconnected.

4. The combustion engine according to claim 3, wherein said first and second non-return valves each includes slit-shaped openings located between an inlet chamber and an outlet chamber of a respective said first and second non-return valve, and also includes pre-tensioned elastic rings to cover said slit-shaped openings, respectively, wherein said pre-tensioned elastic rings are constructed and arranged to be displaced from said slit-shaped openings via pressurized hydraulic fluid flowing through the inlet chamber of a respective said first and second non-return valve.

5. The combustion engine according to claim 3, wherein said piston defining said rigid wall includes an actuation surface and said adjustable hydraulic pumping device is to be driven by displacement of said piston defining said rigid wall via said actuation surface, and further comprising an adjustable throttle to be positioned in a backflow line interconnecting the at least one constant hydraulic engine with a cylinder of said at least one hydraulic-piston-cylinder unit such that the speed at which a piston housed within the cylinder of said at least one hydraulic-piston-cylinder unit travels during an implosion stroke of the combustion engine can be adjustably set.

6. The combustion engine according to claim 2, wherein said adjustable hydraulic pumping device is also to drive at least one additional hydraulic engine being arranged in parallel with the at least one constant hydraulic engine and having a different power rating than that of the at least one constant hydraulic engine.

7. The combustion engine according to claim 2, wherein said adjustable hydraulic pumping device further includes a second hydraulic-piston-cylinder unit to drive the at least one constant hydraulic engine, with said at least one hydraulic-piston-cylinder unit and said second hydraulic-piston-cylinder unit being symmetrically arranged relative to said piston defining said rigid wall such that upon actuation of said at least one and second hydraulic-piston-cylinder units, resulting from displacement of said piston defining said rigid wall, no lateral force is exerted on said piston defining said rigid wall.

8. The combustion engine according to claim 7, wherein said at least one and second hydraulic-piston-cylinder units each are connected in an articulatory manner to said piston defining said rigid wall and to a respective adjustment rod, such that an inclination of a respective axis of said at least one and second hydraulic-piston-cylinder units relative to an axis of said piston defining said rigid wall can be changed to adjust the pumping amount and pumping pressure of said at least one and second hydraulic-piston-cylinder units.

9. A combustion engine comprising:
   a combustion chamber having a constant volume and an ignition device to burn a fuel such that a combustion gas is generated during an explosion stroke of the combustion engine;
   a working chamber separate from and in fluid communication with said combustion chamber, and having a rigid wall that is displaceable by the combustion gas flowing from said combustion chamber into said working chamber during the explosion stroke of the combustion engine such that energy of the combustion gas is converted into mechanical energy, with said rigid wall being connected to a storage device in order to store energy released during an implosion stroke of the combustion engine and then release this energy during a subsequent explosion stroke of the combustion engine; and
   at least one spray device to spray a cooling liquid into said working chamber to create the implosion stroke of the combustion engine following an explosion stroke of the combustion engine.

10. The combustion engine according to claim 9, wherein said rigid wall is defined by a piston.

11. The combustion engine according to claim 10, wherein said storage device is constructed and arranged to be subjected to a counter-force via said piston initially during the explosion stroke of the combustion engine, and then after this counter-force is overcome to support movement of said piston during the explosion stroke of the combustion engine.

12. The combustion engine according to claim 10, wherein said working chamber is defined by a cylinder in which said piston is displaceably housed.

13. The combustion engine according to claim 10, wherein the maximum volume of said working chamber is at least five times greater than the volume of said combustion chamber.

14. A combustion engine comprising:
   a combustion chamber having an ignition device to burn a fuel such that a combustion gas is generated during an explosion stroke of the combustion engine;
   a working chamber separate from and in fluid communication with said combustion chamber, and having a rigid wall that is displaceable by the combustion gas flowing from said combustion chamber into said working chamber during the explosion stroke of the combustion engine such that energy of the combustion gas is converted into mechanical energy during the explosion stroke of the combustion engine; and
   at least one spray device to spray a cooling liquid into said working chamber to create an implosion stroke of the combustion engine following the explosion stroke of the combustion engine, during which implosion stroke said rigid wall is displaced such that energy of the combustion gas is also converted into mechanical energy during the implosion stroke of the combustion engine.

15. The combustion engine according to claim 14, wherein said working chamber comprises a cylinder having a cylinder head, and said rigid wall is defined by a piston displaceably housed within said cylinder such that a top dead center position of said piston is adjacent said cylinder head.

16. The combustion engine according to claim 15, wherein the volume of said combustion chamber is constant.

17. The combustion engine according to claim 16, wherein said cylinder further has a cylinder wall, and said working chamber includes an outlet valve having an opening that is defined by an annular gap between said cylinder head and said cylinder wall.

18. The combustion engine according to claim 17, wherein said combustion chamber is constructed and arranged to receive air and fuel, or a mixture thereof, to the exclusion of said working chamber, such that a pressure of a mixture of fuel and air in said combustion chamber prior to ignition is within the range of 0.8 to 2.0 bar.

19. A method of operating a combustion engine, comprising:
   burning fuel in a combustion chamber having rigid walls, thereby generating a combustion gas during an explosion stroke of the combustion engine;
   allowing said combustion gas to flow from said combustion chamber into a separate working chamber having a movable rigid wall, whereby said combustion gas performs mechanical work by displacing said movable rigid wall such that movement of a drive shaft results, wherein said combustion gas expands to approximately atmospheric pressure upon completion of the performance of the mechanical work; then
   spraying a cooling medium into said working chamber, thereby causing said combustion gas in said working chamber to be abruptly reduced to a sub-atmospheric pressure during an implosion stroke of the combustion engine such that at least partial further mechanical work is performed on the drive shaft in accordance with one of the following two manners,
   (i) the at least partial further mechanical work performed on the drive shaft occurs immediately upon the spraying of the cooling medium into said working chamber, and
   (ii) the at least partial further mechanical work performed on the drive shaft occurs as a result of converting mechanical work of said combustion gas during the implosion stroke of the combustion engine initially into energy that is stored by a storage device and subsequently applied to the drive shaft.

20. The method according to claim 19, wherein said working chamber comprises a cylinder having a cylinder wall and a cylinder head, wherein said movable rigid wall is defined by a piston that is displaceably housed within said cylinder wall, and wherein the at least partial further mechanical work performed on the drive shaft resulting from the spraying of the cooling medium into said working chamber causes a top dead center of said piston to be located adjacent said cylinder head.

21. The method according to claim 19, and further comprising, prior to the burning of the fuel within said combustion chamber, supplying air and fuel into said combustion chamber and spraying water into said combustion chamber.

* * * * *